G. W. COOPER.
TRAP.
APPLICATION FILED MAR. 31, 1919.
1,320,844.
Patented Nov. 4, 1919.
2 SHEETS—SHEET 1.
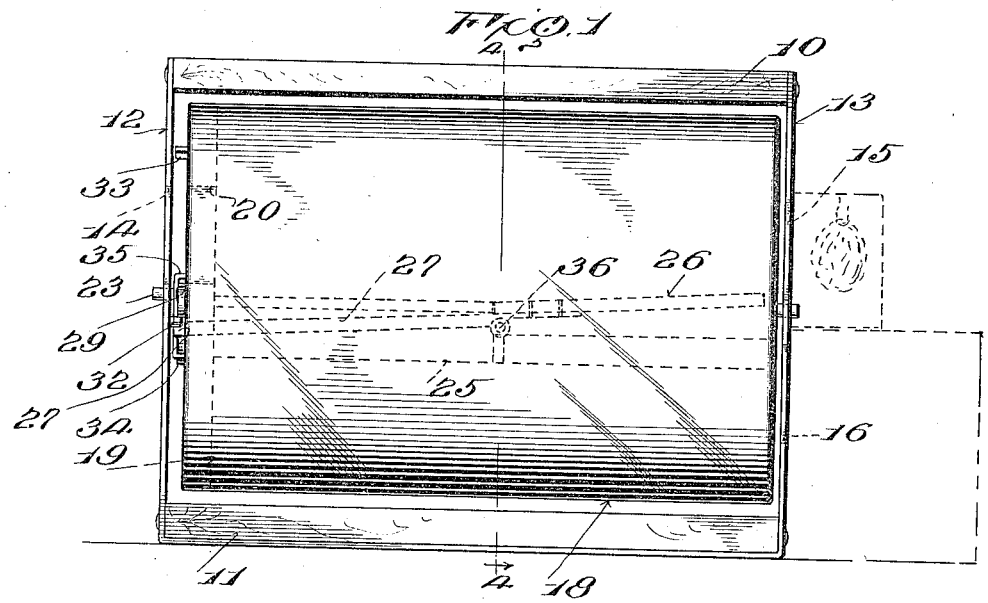
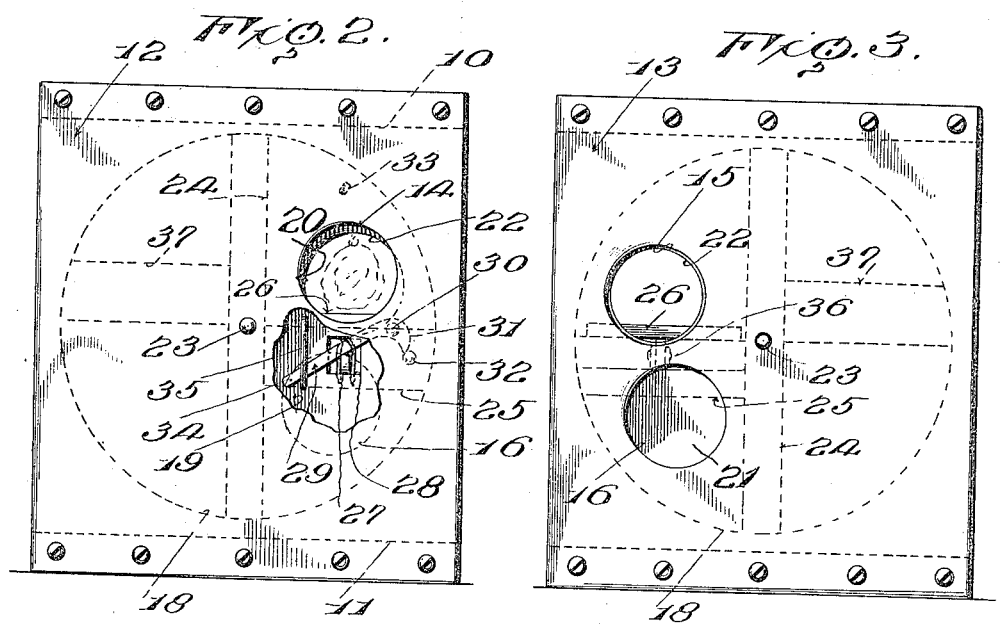
Inventor
G. W. Cooper
By Chandler Chandler
Attorneys.

G. W. COOPER.
TRAP.
APPLICATION FILED MAR. 31, 1919.
1,320,844.
Patented Nov. 4, 1919.
2 SHEETS—SHEET 2.
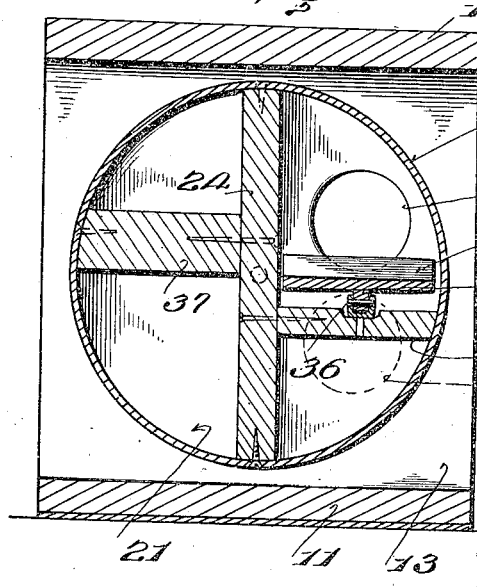
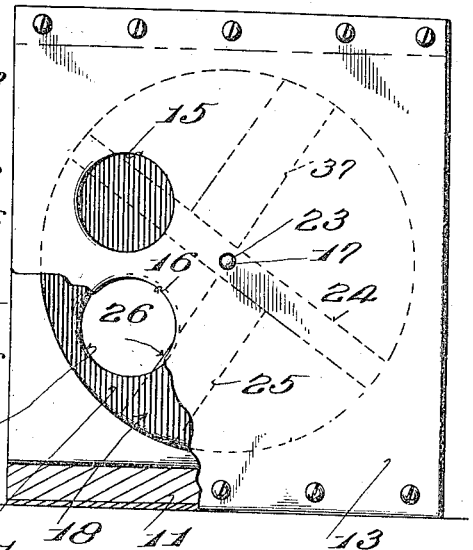
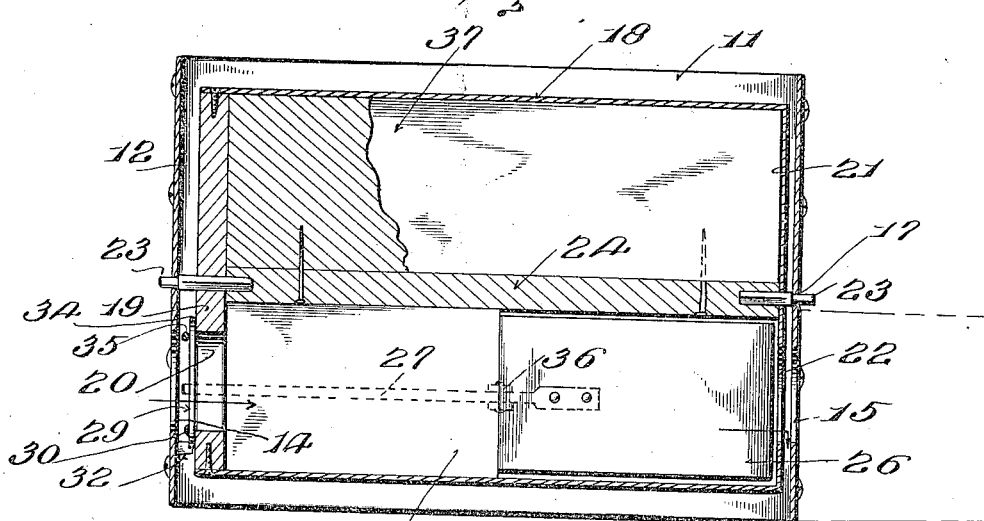
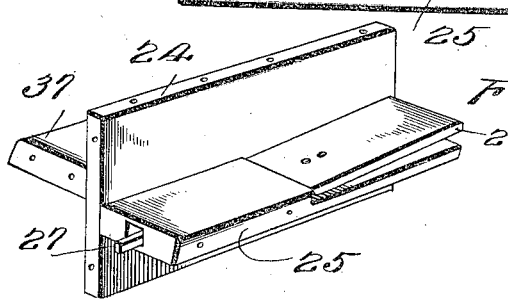
Inventor
G. W. Cooper
Attorneys

UNITED STATES PATENT OFFICE.

GEORGE W. COOPER, OF TOONE, TENNESSEE.

TRAP.

1,320,844. Specification of Letters Patent. Patented Nov. 4, 1919.

Application filed March 31, 1919. Serial No. 286,272.

*To all whom it may concern:*

Be it known that I, GEORGE W. COOPER, a citizen of the United States, residing at Toone, in the county of Hardeman, State of Tennessee, have invented certain new and useful Improvements in Traps; and I do hereby declare the following to be a full, clear, and exact description of the invention, such as will enable others skilled in the art to which it appertains to make and use the same.

This invention relates to novel and useful improvements in traps, more particularly to animal traps, the device being designed to attract and cause the entrance of the animal into the device and to cause its escape or discharge into a cage, without injury to the animal, as well as adapted to be made of such sizes as to permit its use in connection with the trapping of mice or animals as large as a bear.

A further object of the invention is to simplify the construction of a trap having the objects in view as above specified, and which includes a rotatable drum normally set to permit the entrance of the animal into the trap but which upon the animal entering the same, will be caused to move a limited extent as it rotates in its bearings, so that the animal instead of having access to the bait, will be brought to position at the entrance of a cage and will thereby be deceived into entering the latter without possibility of escape, but without being injured.

With the above objects and others in view, as will appear, as the specification proceeds, the invention comprises certain novel combinations and arrangements of parts, as will be hereinafter more fully pointed out and claimed.

Reference is had to the accompanying drawings forming a part of this application, wherein like reference characters indicate corresponding parts throughout the several views, and wherein:

Figure 1 is a side elevation of the improved trap;

Fig. 2 is an end elevation thereof;

Fig. 3 is an end elevation, showing the opposite end;

Fig. 4 is a cross sectional view taken on the line 4—4 of Fig. 1;

Fig. 5 is a longitudinal sectional view;

Fig. 6 is an end elevation partly in section showing the trap in position to deliver the animal into the cage, and Fig. 7 is a detail perspective view of the parts mounted in the drum.

Referring to the drawings in detail, my improved trap is shown as embodying a frame including top and bottom members 10 and 11 and end members 12 and 13 suitably connected and braced thereto. The end member 12 constitutes the front of the trap and has an entrance opening 14 formed therethrough immediately above its vertical axis. The end wall 13 constitutes the rear end of the trap and has formed therethrough, an upper opening 15 and a lower opening 16 located on a common circle. Both of these openings are located concentric to the axis of the device formed by the bearings 17 in the end walls, or otherwise formed, and the opening 15 is located above the axis, while the opening 16 is located below said axis. The bait box is designed to be placed adjacent to the opening 15, and the opening 16 communicates with the entrance to a suitable cage into which the animal is designed to be confined against escape, either on land or in water.

Rotatably mounted in the end walls 12 and 13, is a drum 18 having a solid lateral section or circular wall in the form of a cylinder, while adjacent to the front end, there is provided an end wall 19 having an entrance opening 20 therein. The opposite end wall is designated at 21 and is provided with a single opening 22 in alinement with the opening 20 longitudinally of the drum or cylinder. These end walls carry pivots 23 engaged in the bearings or openings 17 so that the drum is rotatably supported in the end walls 12 and 13.

Arranged within the drum or cylinder and extending longitudinally thereof in a diametrical direction is a partition 24 located in an upward direction with respect to the openings 20 and 22, while positioned below said openings 14 and 20 and disposed substantially at right angles to the partition 24, is a partition 25 including a pivoted treadle 26 having connection through the medium of a lever 27 extending through the end wall 19, through the medium of an opening 28 therein, with a trigger 29. This trigger is pivoted near one end adjacent to the periphery of the drum as shown at 30 so that the arm 31 will project and by engaging a stop or pin 32 extending inwardly from the end wall 12, will limit the rotation of the drum. The long arm of the lever being normally weighted, is designed to normally drop, so as to throw the short arm outwardly for engagement with the pin, while the drum is limited in its rotation through the medium of a stop 33 which is designed to engage the stop 32. The lever 27 is limited in its movement in the opening 28, while the long arm 34 of the lever 29 is confined within a loop 35 to prevent it from moving to an inoperative position but permitting it to move into the path of the lever 27 to cause the release of the catch in a manner as will be hereinafter made apparent.

The partition 25 is so positioned that its upper face will be disposed substantially in alinement with the bottom portions of the openings 14 and 15, thus extending radially with respect to the drum or cylinder. The treadle 26 terminates about mid-way of the length of the drum and partition, and is pivoted at its inner end as shown at 36 so as to move on a horizontal axis together with the lever 27, which latter is rigid and secured at one end to the bottom of the treadle, while the other end is weighted to normally elevate the treadle and permit the catch to move to an operative position so that the short arm 31 will be normally in position to engage the stop 32. A counterweight 37 positioned upon the opposite side of the partition 24 and above the axis of the drum, serves to counterbalance the weight of the partition and parts held thereby, thus normally holding the drum in position so that the openings 20 and 22 will be disposed in alinement with the openings 14 and 15. However, when the animal enters the drum through the openings 14 and 20, and endeavors to secure the bait through the opening 15, the weight thereof upon the treadle will cause downward swinging of the latter and elevation of the weighted end of the lever 27, so as to release the catch and permit the drum to turn limited in its rotation as heretofore specified. The weight of the animal will also cause overbalancing of the counterweight, so that the exit opening 22 will be brought into registry with the opening 16, whereby the only possible escape of the animal will be through the opening 16 into the cage positioned adjacent thereto, inasmuch as the opening 14 will be closed owing to the opening 20 moving out of registration with respect thereto. Upon the animal making its exit, the drum will return to normal or operative position automatically, thereby constituting a trap of the self-set and ever-set type. It will also be apparent as explained, that injury to the animal will be prevented, whether the device is used upon land or in water.

What is claimed is:

1. In a trap, a frame having end walls one of said end walls having an opening therein and the other of said end walls having a pair of adjacent openings therein, a drum journaled to turn on a horizontal axis in said end walls and having an opening in each end, a partition in the drum, a second partition at right angles to the first named partition and disposed to form a flooring beneath the openings, in the ends of the drum, said latter partition having a pivoted part forming a treadle and a weighted lever extending therefrom and through one end of the drum, a catch pivoted on said end and normally held in position to limit the rotation of the drum, when the openings in the latter are alined with the entrance opening of one end wall of the frame and the end wall at the other end adjacent to which a bait box is designed to be disposed, a counterbalance weight at the opposite side of the partition, and a stop carried by the end wall adjacent to the catch to engage the latter to limit the rotation of the drum, the said treadle upon the animal stepping thereon being designed to move the catch to inoperative position for permitting the drum to turn, whereby the entrance opening is closed and the exit opening of the drum is brought into registry with the second opening in the adjacent end wall for discharging the animal into a cage or the like adapted to be positioned adjacent thereto.

2. A trap comprising a support, a drum journaled therein to oscillate on a horizontal axis, said drum having alined openings in the opposite ends thereof, a partition in the drum normally brought in a position below said openings, said support having an opening in one end and a pair of openings in the opposite end, one of which is normally in alinement with the openings in the drum and the other of which is adapted to be brought into alinement therewith upon the animal entering the drum through the opening in the opposite end thereof, thereby closing the latter opening and the opening normally in alinement and permitting escape through the other opening only, for discharge into a cage or the like, counter balancing means for the drum positioned therein, means coöperative between the drum and the support at one end to retain the drum in normal position and to limit the oscillatory movement thereof in either direction, said counter-balancing means serving to return said drum to initial operative position upon the escape of the animal, as and for the purposes specified.

3. In a trap, a frame having end walls one of said end walls having an opening therein and the other of said end walls having a pair of adjacent openings therein located on a common circle, a drum journaled to turn on a horizontal axis in said end walls and having an opening in each end, means within the drum to normally position the same whereby the latter openings will be disposed in alinement with openings at the ends of the frame to form a clear passage therethrough, whereby to permit the entrance of an animal into the trap, means to limit the rotation of the drum in either direction to oscillation, and means operated by the weight of the animal to permit partial turning of the drum under said weight whereby the openings in the latter will be brought into alinement with the other of the pair of openings in the exit end of the trap, while closing the opposite end, said means comprising a partition in the cylinder, said partition having a pivoted tread part and means coöperative between said pivoted part and one end of the cylinder and the adjacent end of the frame, to normally retain the partition in a horizontal position and adapted to release the same upon the animal treading thereon to permit said partition to move to a downward position limited against further turning.

4. The combination with a support, in a trap of the class described, a movable element carried by the support and having entrance and exit openings at opposite ends thereof, said support having a single opening at the entrance end and a pair of openings at the exit end adjacent to one of which a bait is adapted to be disposed, and the other of which leads into a suitable cage, means normally holding the movable member with the openings thereof in alinement with the single opening and the bait opening and adapted upon the animal entering the movable member, to shift the latter whereby the entrance opening in the movable member will be closed and the opening at the opposite or exit end thereof will be brought into engagement with the cage opening, said means comprising a longitudinal radial partition in the movable element having a pivoted portion normally elevated, a catch coöperative with said pivoted portion at one end of the movable element, a pin projecting inwardly from one end of the support to engage said catch to hold the movable element in the normal position and a pin on the movable element engageable with said first-named pin to limit the movement of said element upon the release of the catch.

5. The combination with a support, in a trap of the class described, a movable element carried by the support and having entrance and exit openings at opposite ends thereof, said support having a single opening at the entrance end and a pair of openings at the exit end adjacent to one of which a bait is adapted to be disposed, and the other of which leads into a suitable cage, means at the entrance end for normally holding the movable member with the openings thereof in alinement with the single opening and the bait opening and adapted upon the animal entering the movable member, to shift the latter whereby the entrance opening in the movable member will be closed and the opening at the opposite or exit end thereof will be brought into engagement with the cage opening, means at the same end for limiting the movement of the movable member and means normally returning said movable member to an initial set position automatically.

In testimony whereof, I affix my signature, in the presence of two witnesses.

GEORGE W. COOPER.

Witnesses:
G. L. BRADFORD,
J. M. SMITH.

Copies of this patent may be obtained for five cents each, by addressing the "Commissioner of Patents, Washington, D. C."